(12) United States Patent
Le Brun et al.

(10) Patent No.: US 8,824,115 B2
(45) Date of Patent: Sep. 2, 2014

(54) VEHICLE COMMUNICATION COMPONENT AND PROCESS HAVING ACTIVE OVERVOLTAGE PROTECTION

(71) Applicant: Service Solutions U.S. LLC, Charlotte, NC (US)

(72) Inventors: Marco Le Brun, Florence (IT); Manokar Chinnadurai, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/664,703

(22) Filed: Oct. 31, 2012

(65) Prior Publication Data

US 2013/0107408 A1    May 2, 2013

Related U.S. Application Data

(60) Provisional application No. 61/553,612, filed on Oct. 31, 2011.

(51) Int. Cl.
    *H02H 3/20*    (2006.01)
(52) U.S. Cl.
    USPC .......................................................... 361/90
(58) Field of Classification Search
    USPC .......................................................... 361/90
    See application file for complete search history.

(56) References Cited

U.S. PATENT DOCUMENTS

| | | | | |
|---|---|---|---|---|
| 5,903,426 | A * | 5/1999 | Ehling | 361/119 |
| 6,148,258 | A * | 11/2000 | Boisvert et al. | 701/99 |
| 6,167,321 | A * | 12/2000 | Chan et al. | 700/100 |
| 6,456,473 | B1 * | 9/2002 | Olson | 361/91.1 |
| 6,510,485 | B1 * | 1/2003 | Shin | 710/315 |
| 7,262,945 | B2 * | 8/2007 | Galang et al. | 361/91.1 |
| 7,391,299 | B2 * | 6/2008 | Bender et al. | 340/292 |
| 7,508,643 | B2 * | 3/2009 | Shreiner et al. | 361/119 |
| 7,576,635 | B2 * | 8/2009 | Bender et al. | 340/292 |
| 2005/0267728 | A1 * | 12/2005 | Maher et al. | 703/25 |
| 2006/0077611 | A1 * | 4/2006 | Bender et al. | 361/104 |
| 2006/0087785 | A1 * | 4/2006 | Bender et al. | 361/93.1 |
| 2008/0179965 | A1 * | 7/2008 | Paillet et al. | 307/125 |
| 2008/0238192 | A1 | 10/2008 | Hashimoto et al. | |
| 2009/0190273 | A1 | 7/2009 | Moran et al. | |
| 2010/0008004 | A1 | 1/2010 | Galang et al. | |
| 2013/0107408 | A1 * | 5/2013 | Le Brun et al. | 361/90 |
| 2014/0035527 | A1 * | 2/2014 | Hayashigawa et al. | 320/109 |

OTHER PUBLICATIONS

International Search Report and Written Opinion issued in related application No. PCT/US2012/062695 on Feb. 1, 2013.

* cited by examiner

*Primary Examiner* — Ronald W Leja
(74) *Attorney, Agent, or Firm* — Baker Hostetler LLP

(57) ABSTRACT

An active overvoltage protection process and device is disclosed to protect vehicle communication components. The overvoltage protection process and device includes determining an allowed low and high voltage threshold range for a communication interface, monitoring the communication interface, and disconnecting the communication interface when a voltage of the communication outside a threshold range.

16 Claims, 3 Drawing Sheets

VEHICLE COMMUNICATION COMPONENT AND PROCESS HAVING ACTIVE OVERVOLTAGE PROTECTION

CROSS-REFERENCE TO RELATED APPLICATIONS

This application claims the benefit from U.S. Provisional Application No. 61/553,612 filed on Oct. 31, 2011, which is hereby incorporated by reference in its entirety for all purposes as if fully set forth herein.

FIELD OF THE INVENTION

The invention relates generally to a protection device and process for vehicle communication components such as a vehicle communication interface (VCI), a diagnostic tool, a scan tool, a Personal Computer (PC), a diagnostic computer, a vehicle, and/or the like. More particularly, the invention relates to an active overvoltage protection device and process for vehicle communication components such as a vehicle communication interface (VCI), a diagnostic tool, a scan tool, a Personal Computer (PC), a diagnostic computer, a vehicle, and/or the like.

BACKGROUND OF THE INVENTION

Modern vehicles typically have one or more diagnostic systems, generally having separate computer control modules or electronic control units (ECUs) to control various functions of the vehicle. Some examples include a powertrain control module (PCM), engine control module (ECM), transmission control module (TCM), and anti-locking brake system (ABS). The vehicle diagnostic systems often have self-diagnostic capability to detect and alert the driver of problems the vehicle may be encountering. When a problem is found, a diagnostic trouble code (DTC) is set within the computer's memory. DTCs are as general or as specific as the manufacturer desires.

To retrieve and decipher DTCs, an auto repair technician needs to connect to the vehicle and be able to communicate with the vehicle. A device, such as one or a combination of a VCI, a diagnostic tool, a scan tool, a Personal Computer (PC), diagnostic computer or the like is typically used to communicate, retrieve, and decipher the DTCs. In one typical implementation, the VCI translates between the vehicle communication protocol and a PC communication protocol. In this scenario, the PC serves as the user interface portion of the diagnostic system. Alternatively, one could use a scan tool, which would communicate with the vehicle directly and has its own discrete user interface.

The vehicle communication components, such as a VCI, are typically equipped to communicate in various communication protocols such as Controller Area Network (CAN), SAE Jl850 VPW, PWM, ISO 9141, and others. These communication protocols may be specific to the various automobile manufacturers and others may be fairly standardized, at least at the physical layer.

A cable is typically used to interface with the vehicle. Although the vehicle communication components typically have a SAE J 1962 type connector having 16 pins for various communications, power supply, controls and measurements, the use of the different pins for different functions varies between the different modules in the vehicle and can also vary with different manufactures of the vehicles. In some instances, the vehicle communication components may implement other types of connectors and other types of cables may be substituted for the cable with the SAE J 1962 type connector, for example a 38 way connector for Daimler vehicles or a 20 way connector for BMW vehicles or a SAE J1939-13 connector for heavy duty vehicles.

To achieve communication, vehicle communication components such as a VCI may contain multiple protocol drivers and a multiplexing circuit (MUX) capable of connecting a choice of those protocols drivers to a choice of pins of the vehicle diagnostic link connector (DLC). Different protocols operate at different voltage levels and the vehicle manufacturer may use reserved pins of the DLC for different power lines and signals.

A problem known with this methodology involves excessive voltage between one or more of a VCI, a diagnostic tool, a scan tool, a PC, a diagnostic computer, a vehicle, and/or the associated components. For example, as the different protocols operate at different voltage levels, and as the vehicle manufacturer may use reserved pins of the DLC for different power lines and signals, an incorrect connection may lead to a voltage overload situation and potential damage may result in one or more of the VCI, the diagnostic tool, the scan tool, the PC, the diagnostic computer, the vehicle, and/or the associated components.

Accordingly, it is desirable to provide an apparatus and process to protect the vehicle communication components from damage.

SUMMARY OF THE INVENTION

The foregoing needs are met, to a great extent, by the invention, wherein in one aspect overvoltage protection capabilities are provided to a VCI, a diagnostic tool, a scan tool, a PC, a diagnostic computer, a vehicle, and/or the like.

In one aspect an active overvoltage protection device to protect a vehicle communication component includes a voltage determination circuit configured to determine an allowed low and high voltage threshold range for a communication interface, a voltage monitoring circuit configured to monitor a voltage of the communication interface, and a disconnection circuit configured to one of disconnect the communication interface when the voltage of the communication interface is outside a threshold range and prevent connection of the communication interface when the voltage of the communication interface is outside the threshold range.

In another aspect an active overvoltage protection process to protect a vehicle communication component includes determining an allowed low and high voltage threshold range for a communication interface, monitoring a signal voltage of the communication interface, disconnecting the communication interface when a voltage of a communication signal is outside a threshold range if the communication interface is connected, and preventing connection of the communication interface when the voltage of the communication signal is outside the threshold range if the communication interface is not connected.

In another aspect an active overvoltage protection device to protect a vehicle communication component includes means for determining an allowed low and high voltage threshold range for a communication interface, means for monitoring a signal voltage of the communication interface, and means for disconnecting the communication interface when a voltage of a communication signal is outside a threshold range if the communication interface is connected, and means for preventing connection of the communication interface when the voltage of the communication signal is outside the threshold range if the communication interface is not connected.

In accordance with another aspect of the invention, an active overvoltage protection process to protect vehicle communication components includes determining an allowed low and high voltage threshold range for a communication interface, monitoring the communication interface, and disconnecting the communication interface when a voltage of a communication signal is outside a threshold range.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
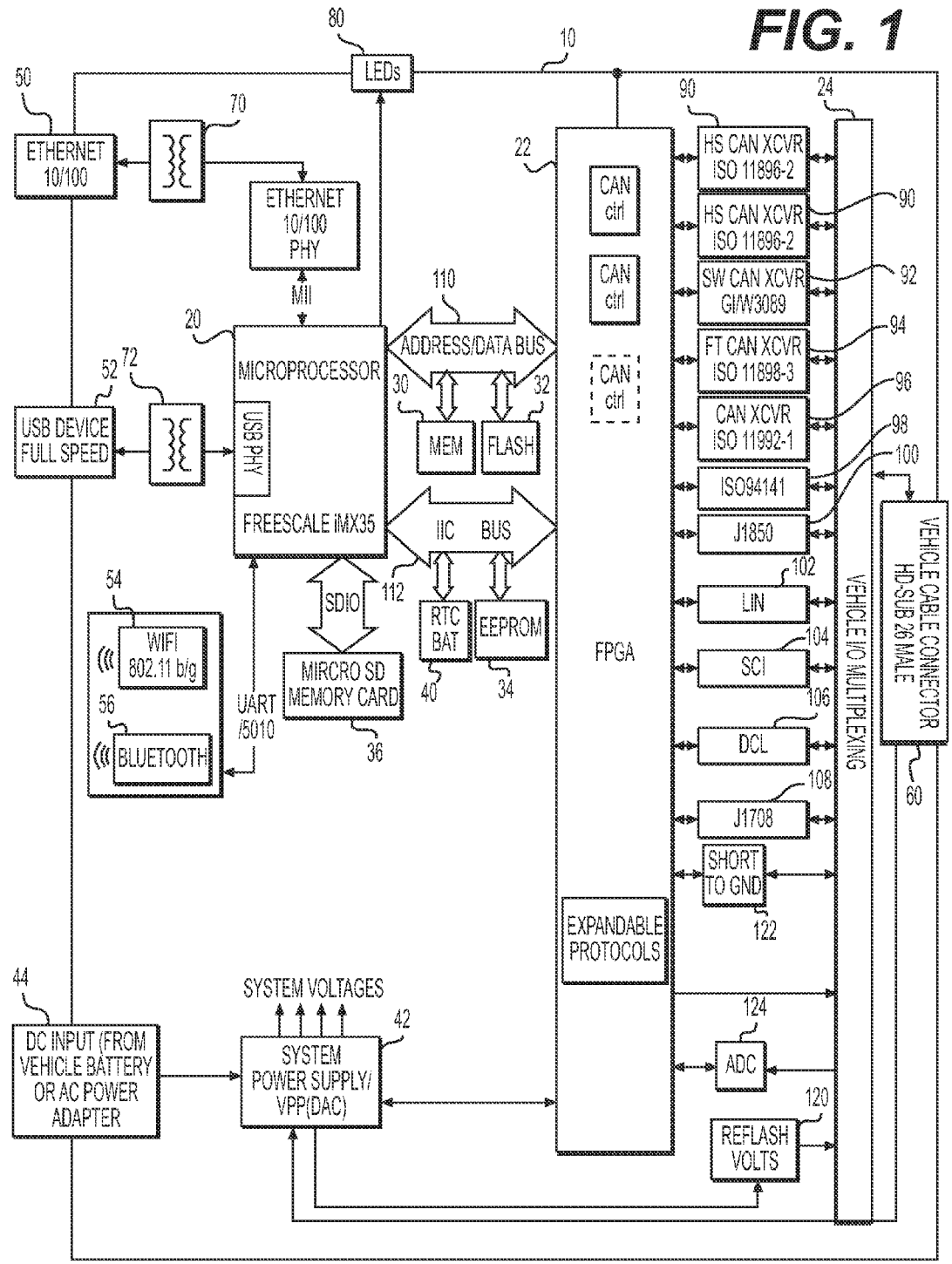
FIG. 1 is a block diagram of a vehicle communication device, such as a VCI, configured with an active overvoltage protection device according to one aspect of the invention.

The invention will now be described with reference to the drawing figures, in which like reference numerals refer to like parts throughout. An aspect in accordance with the invention provides a vehicle communication device, such as a VCI, with an active overvoltage protection device.

FIG. 1 is a block diagram of a vehicle communication component, such as a VCI, that includes an active overvoltage protection device according to one aspect of the invention. It should be noted that the details of FIG. 1 and the description below are contemplated for use as a protection device for vehicle communication components such as a diagnostic tool, a scan tool, a Personal Computer (PC), a diagnostic computer, a vehicle, and/or the like as well. However, for brevity, the description will focus on a VCI implementation of the invention. In particular, the VCI 10 can include numerous components such as the following: an electrical signal processing device, a memory device, a power device, a peripheral device connector, a vehicle connector, a circuit protection device, a display, a communication protocol device, an electrical signal bus and so on. This list of VCI 10 components is exemplary and in no way limiting the number and types of components that can make up the VCI 10.

The electrical signal processing device of the VCI 10 can be implemented in many aspects, some of which can include multiple electrical signal processing devices. In one aspect of the VCI 10, the electrical signal processing device can be a programmable device, such as a microprocessor 20, a field programmable gate array (FPGA) 22, a complex programmable logic device (CPLD not shown), or other programmable logic devices. One such programmable logic device may be configured as a multiplexer 24. Other aspects may include non-programmable, hardware implementations of the electrical signal processing device.

The memory device of the VCI 10 can similarly be implemented in a variety of forms, and in some aspects multiple memory devices can be implemented. The varieties of memory devices 30 can include volatile, nonvolatile, solid state, magnetic, optical, permanent, removable, writable, rewriteable, read-only memory and the like. Some examples of the memory that can be used to implement the VCI 10 can include random-access memory (RAM) 30, flash memory 32, electrically erasable programmable read-only memory (EEPROM) 34, and Secure Digital (SD) memory 36. Each of these memory device examples may be implemented in any of their various different forms, which can be selected depending on their purpose and/or application.

The power device can also be implemented in numerous ways, and in some aspects multiple power devices can be implemented. Various aspects of the power device can include a battery or a power supply device 42. The battery can be a vehicle battery or a battery dedicated for use by the VCI 10. The battery can include a real-time clock (RTC) 40, and the battery can be dedicated to running the real-time clock when not otherwise powered by another power source. The power supply device 42 can be implemented to include a power converter, usually to step down the voltage provided from a high voltage power source, such as the vehicle battery or an alternating current (AC) power source, to a level manageable for the VCI 10. A digital-to-analog converter (DAC) can also be a component of the power supply device 42. The DAC can be used to take a digital signal received from the electrical signal processing device (in some aspects, the FPGA 22) and convert the digital signal to a representative analog signal, potentially to apply a voltage to reprogram various components (in some aspects an ECU). The power device can also include a direct current (DC) power device connector 44 which can be connected to an AC power adapter or to the vehicle battery.

Much like the other described devices, the peripheral device connector can be implemented in a variety of forms, and the VCI 10 can include a combination of a number of peripheral device connectors. Some aspects can include peripheral device connectors that are wired and/or wireless. The peripheral device connectors can include wired serial communication connectors, such as an RS-232 connector, an Ethernet connector 50, a USB connector 52, parallel connections and the like. The peripheral device connectors can include wireless connections, such as a Wi-Fi connection 54, a Bluetooth connection 56, and the like.

The VCI 10 may also include a vehicle connector which can act as the interface between the VCI 10 and the ECUs of the vehicle, and/or as the DC power adapter connector 44. The vehicle connector can be any connector capable of coupling with a connector of the vehicle and effecting communication between the VCI 10 and the ECUs. The type of vehicle connector may be dependent on the number and types of a variety of functionalities of the VCI 10, such as different communication protocols, which can correspond to a necessary number of pins for the vehicle connector. The different pins may receive a signal depending on the implemented functionality. For example, an OBDII connector traditionally includes 16 pins, with each of the pins representing a different signal or connection. In one aspect of the VCI 10, the Data Link Connector on the VCI side can be, for example, the ISO 22900-1 specified 26-pin, High Density D-Sub type vehicle connector 60.

The VCI 10 may also include LEDs 80 for messages, status, and the like. A varying number of illuminated LEDs 80, patterns of illuminated LEDs 80, colors of illuminated LEDs 80, or flashing sequences of illuminated LEDs 80, can indicate different messages. One or more of the LEDs 80 may be controlled by the microprocessor 20 and one or more of the LEDs 80 may be controlled by the FPGA 22.

A communication protocol device can be included in the VCI 10 to effect the communication between the VCI 10 and the ECUs of the vehicle via a communication protocol. The appropriate software, receivers, and transceivers for each communication protocol can be implemented so that communication can occur. Some such communication protocol devices can be configured for use with individual communication protocols. In one aspect, the VCI 10 can include various high speed, single wire, or fault-tolerant controller area network (CAN) communication protocol devices, such as an ISO 11898-2 communication protocol device 90, GMW3089 communication protocol device 92, ISO 11898-3 communication protocol device 94, ISO 11992-1 communication protocol device 96, ISO 9141 communication protocol device 98, Jl850 communication protocol device 100, LIN communication protocol device 102, SCI communication protocol device 104, DCL communication protocol device 106, Jl708 communication protocol device 108, and the like. Alternatively, the SAE Jl850 communication protocol device 100, DCL communication protocol device 106, and Jl708 communication protocol device 108 may be supported by a single circuit. Each of the communication protocol devices can be positioned between the FPGA 22 and the multiplexer 24. The FPGA 22 and the multiplexer 24 allow the proper communication protocol to be used to communicate with the vehicle. The multiplexer 24 is connected to the vehicle connector 60 to transfer the signals between the vehicle and the FPGA 22.

To connect each of the electrical components, the VCI 10 can include an electrical signal bus for carrying electrical signals between the electrical components. In one aspect, the electrical signal bus can be a specific type of bus implemented to put certain electrical components in communication with each other. Examples of such busses can include an address/data parallel bus 112, connecting the microprocessor 20, the FPGA 22, the memory devices 30, such as RAM, and the flash memory 32, and an IIC bus 112, connecting the microprocessor 20, the FPGA 22, the RTC 40 with backup battery and the EEPROM 34. Other components can be connected by appropriate wiring between the components desired to be connected. Some connections can be made through specific interfaces as well. In some aspects, the microprocessor 20 may be connected to the Wi-Fi connector 54 and to the Bluetooth connector 56 through a universal asynchronous receiver/transmitter (UART) and/or a Secure Digital Input Output (SDIO) interface and to the Ethernet connector 50 through a media independent interface (MII) and an Ethernet physical transceiver. Other aspects of the invention can also include a connection between the power supply device 42 and a reflash voltage input 120 of the multiplexer 24, a connection between the multiplexer 24, a grounding device 122 and the FPGA 22, and a connection between the multiplexer 24, an analog-to-digital converter (ADC) 124 and the FPGA 22 and so on to transfer the signals from the ECUs to the VCI 10.

As described above, vehicle communication components such as the VCI 10 contain multiple protocol drivers and a multiplexer 24 capable of connecting a choice of those protocols drivers to a choice of pins of the vehicle diagnostic link connector (DLC). As different protocols operate at different voltage levels, and as the vehicle manufacturer may use reserved pins of the DLC for different power lines and signals, an incorrect connection may lead to an overload situation and potential damage both in the VCI 10 and to the vehicle. Protection of the electrical components of the VCI 10 can be implemented by using the protection device and/or process of the invention. The protection device and/or process may prevent damage or reduce the likelihood of damage to the electrical components of the VCI 10 when an incorrect connection is made.

The protection device of the invention may determine the allowed low and high voltage threshold ranges for the connections of the vehicle communication components such as for one or more of the pins of a connector. The allowed low and high voltage threshold ranges may also be pre-set or predetermined. The protection device then monitors voltages on the connections of the vehicle communication components. When the monitored voltages are outside a given range on the connections of the vehicle communication components, the protection device then may electrically disconnect or isolate the connector or the pin outside a given range. Alternatively, if the connections have not yet been made, the protection device may prevent connection of the connector or the pin that is outside a given range.

More specifically, in the protection device of the invention, the allowed ranges may be pairs of low and high thresholds. For example, a low and high threshold for one or more connector pins. The pairs of low and high thresholds may be written in the application software, stored in a look up table, stored in a database in the memory of the vehicle communication component, hardwired in a circuit, in some form of communication channel (wired, wireless, and the like) as defined below or web-based as defined below.

The ADC 124 may be used to continuously or discretely monitor voltages on the connector. In particular, the ADC 124 may be a multi-channel ADC 124. For example, the multi-channel ADC 124 may monitor the connector, such as the pins of the DLC under control of a processor or controller. The controller may be the Field Programmable Gate Array (FPGA) 22.

The FPGA 22 or other controller will upon detection of voltages outside a given range, disconnect the connector or the connector pin. The disconnection may be by any known type of switch. In particular, the switch may be the multiplexer 24. The FPGA 22 may control the multiplexer 24 and, upon detection of voltages outside a given range, may signal the multiplexer 24 to disconnect the connector or pin. Alternatively, if the connection has not yet been made, the protection device may prevent connection of the connector or the pin that is associated with a voltage that is outside a given range. In particular, the protection device may disconnect and/or prevent connection of the offending pin to the protocol driver. It should be noted that other types of connection components are within the spirit and scope of the invention.

Figure 2:
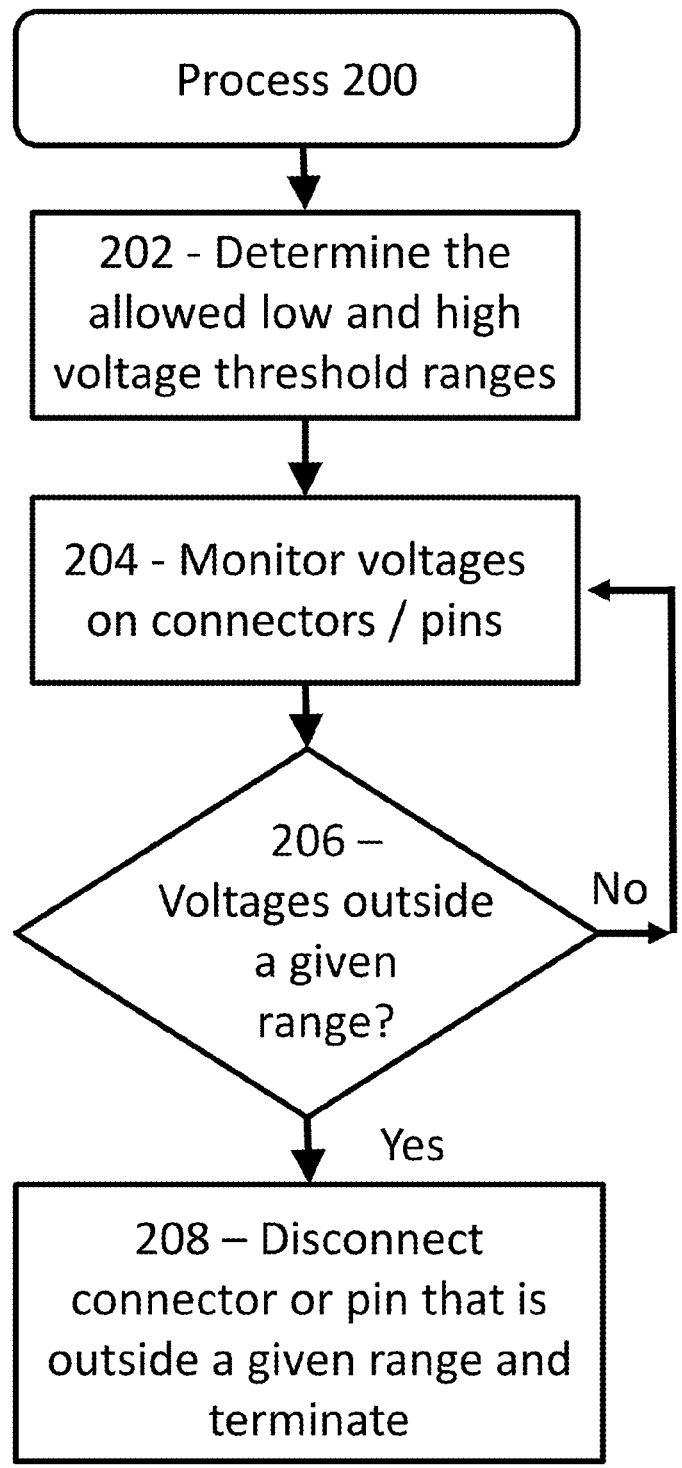
FIG. 2 is a flow chart of an active overvoltage protection process according to an aspect of the invention.

FIG. 2 is a flow chart of a process of operating an active overvoltage protection device according to an aspect of the invention. In particular, as shown FIG. 2 the protection device may be implemented as a protection process 200. The protection process 200 may initially determine the allowed low and high voltage threshold ranges for the connector as shown in 202. The determination may be based on a look up table, stored in a database in the memory of the vehicle communication component, may be stored in another component that may be retrieved via some form of communication channel (wired, wireless, and the like) as defined below, web-based as defined below, or the like.

Next, the protection process 200 may monitor voltages 204 on the connector based on the determination. Monitoring the voltages may include monitoring the voltage on the connector or one or more of the pins of the connector. During the monitoring 204, the protection process may continuously or discretely determine whether the voltages of a connector or one or more of the pins of a connector are outside a given range 206. If the voltages of a connector or one or more of the pins of the connector are not outside a given range (no at 206), then the process will loop and continue the monitoring process described with respect to process steps 204, 206.

If the voltages of a connector or one or more of the pins of the connector are outside a given range (yes at 206), then the process will advance and disconnect the connector and/or pin that is outside a given range in step 208. Thereafter the process will terminate in an error condition.

Figure 3:
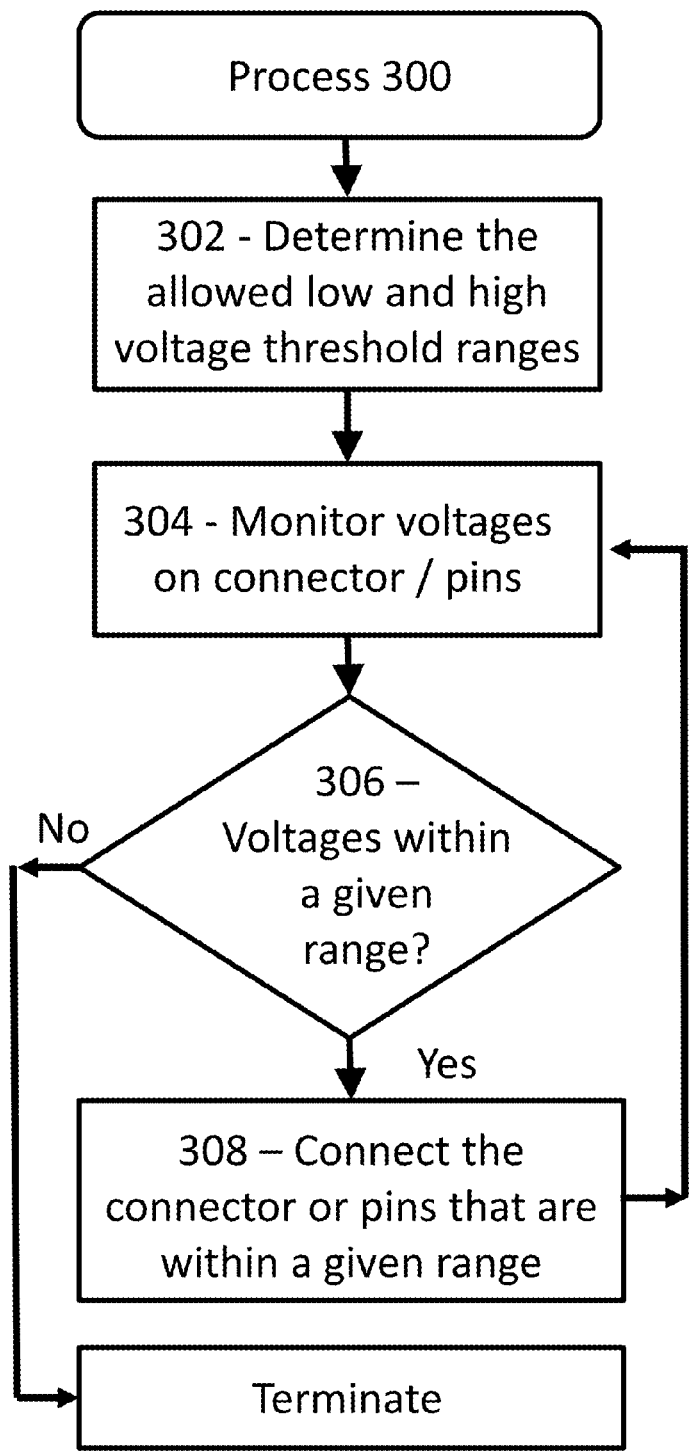
FIG. 3 is another flow chart of an active overvoltage protection process according to an aspect of the invention.

FIG. 3 is a flow chart of another process of operating an active overvoltage protection device according to an aspect of the invention. Similar to the FIG. 2 aspect, the protection process 300 may initially determine the allowed low and high voltage threshold ranges for the connector as shown in 302. The determination may be based on a look up table, stored in a database in the memory of the vehicle communication component, may be stored in another component that may be retrieved via some form of communication channel (wired, wireless, and the like) as defined below, web-based as defined below, or the like.

Next, the protection process 300 may monitor voltages 304 on the connector based on the determination. Monitoring the voltages may include monitoring the voltage on the connector or one or more of the pins of the connector. During the monitoring, the protection process 300 may continuously or discretely determine 306 whether the voltages of a connector or one or more of the pins of a connector are outside a given range. If the voltages of a connector or one or more of the pins of the connector are outside a given range, then the process will terminate in an error condition.

If the voltages of a connector or one or more of the pins of the connector are within a given range, then the process will advance and connect the connector and/or pin 308. Thereafter the process may loop and continue the monitoring process described with respect to process steps 304, 306 of FIG. 3.

Accordingly, the invention provides an active overvoltage protection device and process for vehicle communication components such as a vehicle communication interface (VCI), a diagnostic tool, a scan tool, a Personal Computer (PC), a diagnostic computer, a vehicle, and/or the like; and this active overvoltage protection device and process protects the vehicle communication components from damage.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), the Global System for Mobile Communications (GSM), CDMA (Code-Division Multiple Access), W-CDMA (Wideband Code-Division Multiple Access), and/or the like, and/or a combination of two or more thereof.

In an embodiment, the invention may be web-based. For example, a server may operate a web application to allow the invention to operate in conjunction with a database. The web application may be hosted in a browser controlled environment (e.g., a Java applet and/or the like), coded in a browser supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each device.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, and other hardware devices constructed to implement the methods described herein. The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

It should also be noted that the processes of the invention may be implemented as software; and software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An active overvoltage protection device to protect a vehicle communication component comprising:
   a voltage determination circuit configured to determine an allowed low and high communication voltage threshold range for a communication interface;
   a voltage monitoring circuit configured to monitor a communication voltage of the communication interface; and
   a disconnection circuit configured to disconnect pins of the communication interface when the communication voltage of the communication interface is outside the voltage threshold range and prevent a connection of the pins of the communication interface when the connection has not been previously made and when the communication voltage of the communication interface is outside the voltage threshold range, wherein the disconnection circuit includes a multiplexer positioned between communication protocol drivers and a vehicle cable connector.

2. The active overvoltage protection device of claim 1, wherein the vehicle communication component comprises at least one of a vehicle communication interface (VCI), a diagnostic tool, a scan tool, a Personal Computer (PC), a diagnostic computer, and a vehicle.

3. The active overvoltage protection device of claim 1, wherein the voltage monitoring circuit comprises an analog-to-digital converter (ADC).

4. A vehicle communication interface comprising the active overvoltage protection device of claim 1.

5. The active overvoltage protection device of claim 1, wherein the voltage monitoring circuit is further configured to monitor one or more pins of the communication interface.

6. The active overvoltage protection device of claim 1, wherein the disconnection circuit is configured to disconnect one or more pins of the communication interface.

7. An active overvoltage protection process to protect a vehicle communication component comprising:
   determining an allowed low and high communication voltage threshold range for a communication interface;
   monitoring a signal communication voltage of the communication interface;
   disconnecting, with a multiplexing circuit (MUX), the communication interface when a voltage of a communication signal is outside the voltage threshold range if the communication interface is connected; and
   preventing connection of the communication interface when the voltage of the communication signal is outside the voltage threshold range if the communication interface was not previously connected.

8. The active overvoltage protection process of claim 7, wherein the vehicle communication component comprises at least one of vehicle a communication interface (VCI), a diagnostic tool, a scan tool, a Personal Computer (PC), a diagnostic computer, and a vehicle.

9. The active overvoltage protection process of claim 7, wherein monitoring the communication voltage comprises monitoring with an analog-to-digital converter (ADC).

10. The active overvoltage protection process of claim 7, wherein monitoring the communication voltage comprises monitoring one or more pins of the communication interface.

11. The active overvoltage protection process of claim 7, wherein disconnecting comprises disconnecting one or more pins of the communication interface.

12. An active overvoltage protection device to protect a vehicle communication component comprising:
   means for determining an allowed low and high communication voltage threshold range for a communication interface;
   means for monitoring a signal communication voltage of the communication interface;
   means for disconnecting includes means for multiplexing, the communication interface when a communication voltage of a communication signal is outside the voltage threshold range if the communication interface is connected, wherein the means for disconnecting includes means for multiplexing; and
   means for preventing connection of the communication interface when the voltage of the communication signal is outside the voltage threshold range if the communication interface was not previously connected.

13. The active overvoltage protection device of claim 12, wherein the vehicle communication component comprises at least one of vehicle a communication interface (VCI), a diagnostic tool, a scan tool, a Personal Computer (PC), a diagnostic computer, and a vehicle.

14. The active overvoltage protection device of claim 12, wherein the means for monitoring the signal communication voltage comprises an analog-to-digital converter (ADC).

15. The active overvoltage protection device of claim 12, wherein the means for monitoring the signal communication voltage comprises means for monitoring one or more pins of the communication interface.

16. The active overvoltage protection device of claim 12, wherein the means for disconnecting comprises means for disconnecting one or more pins of the communication interface.

* * * * *